(12) United States Patent
Hotellier

(10) Patent No.: US 7,572,005 B2
(45) Date of Patent: Aug. 11, 2009

(54) COMPACT ELASTIC HINGE FOR A SPECTACLE FRAME

(75) Inventor: Christophe Hotellier, Morez (FR)

(73) Assignee: Comotec, Morez (FR)

( * ) Notice: Subject to any disclaimer, the term of this patent is extended or adjusted under 35 U.S.C. 154(b) by 78 days.

(21) Appl. No.: 11/751,773

(22) Filed: May 22, 2007

(65) Prior Publication Data

US 2008/0192199 A1    Aug. 14, 2008

(30) Foreign Application Priority Data

Feb. 8, 2007    (FR) .................................. 07 00882

(51) Int. Cl.
*G02C 5/00* (2006.01)
(52) U.S. Cl. ................... 351/113; 351/153; 16/228
(58) Field of Classification Search ............ 351/111, 351/113, 153, 41, 158; 16/228
See application file for complete search history.

(56) References Cited

U.S. PATENT DOCUMENTS

| | | | |
|---|---|---|---|
| 4,991,258 A | 2/1991 | Drlik | |
| 5,889,575 A * | 3/1999 | Wang | 351/113 |
| 7,066,595 B1 * | 6/2006 | Chen | 351/113 |
| 2002/0092960 A1 | 7/2002 | Hotellier | |
| 2005/0086768 A1 | 4/2005 | Chang | |
| 2006/0017881 A1 | 1/2006 | Montagner | |

FOREIGN PATENT DOCUMENTS

| | | |
|---|---|---|
| FR | 2 466 788 | 4/1981 |
| WO | 2005/121873 A1 | 12/2005 |

\* cited by examiner

*Primary Examiner*—Hung X Dang
(74) *Attorney, Agent, or Firm*—Panitch, Schwarze Belisario & Nadel LLP

(57) ABSTRACT

An elastic hinge for spectacle frame comprises: a endpiece comprising two parallel flanges holding a hinge axis, a case comprising a longitudinal housing comprising a guiding area, a slide arranged in the housing, comprising a salient part spreading outside the housing and maintained in sandwich between both flanges by the hinge axis and a guided part interacting with the guiding area, and elastic means for returning the slide to a position retracted towards the interior of the housing, at least a prominence not performing the guiding of the slide and spreading out from the case to insert between both flanges, in order to ensure a direct mechanical coupling between the case and the endpiece.

24 Claims, 4 Drawing Sheets

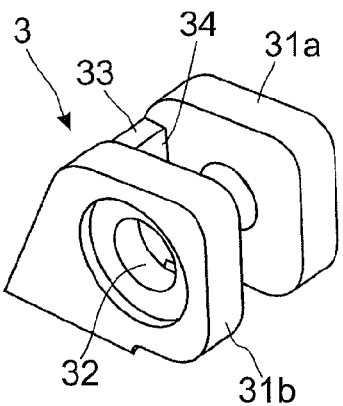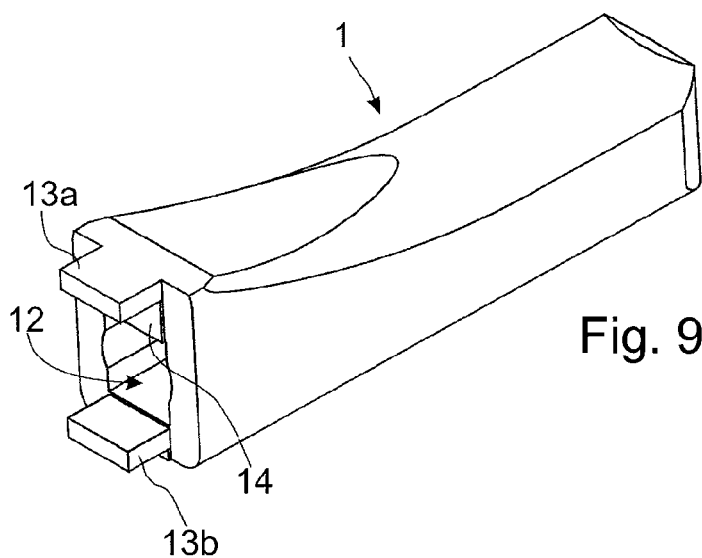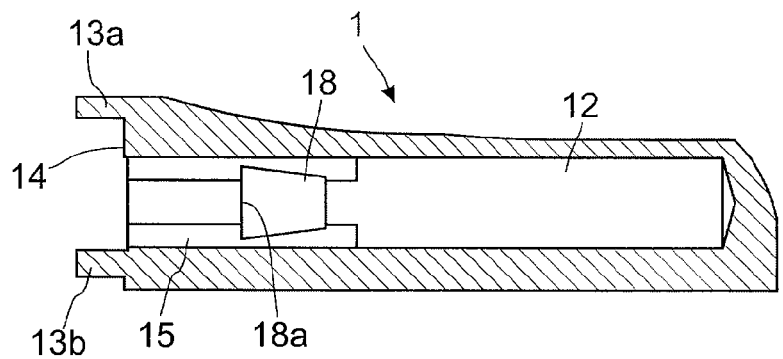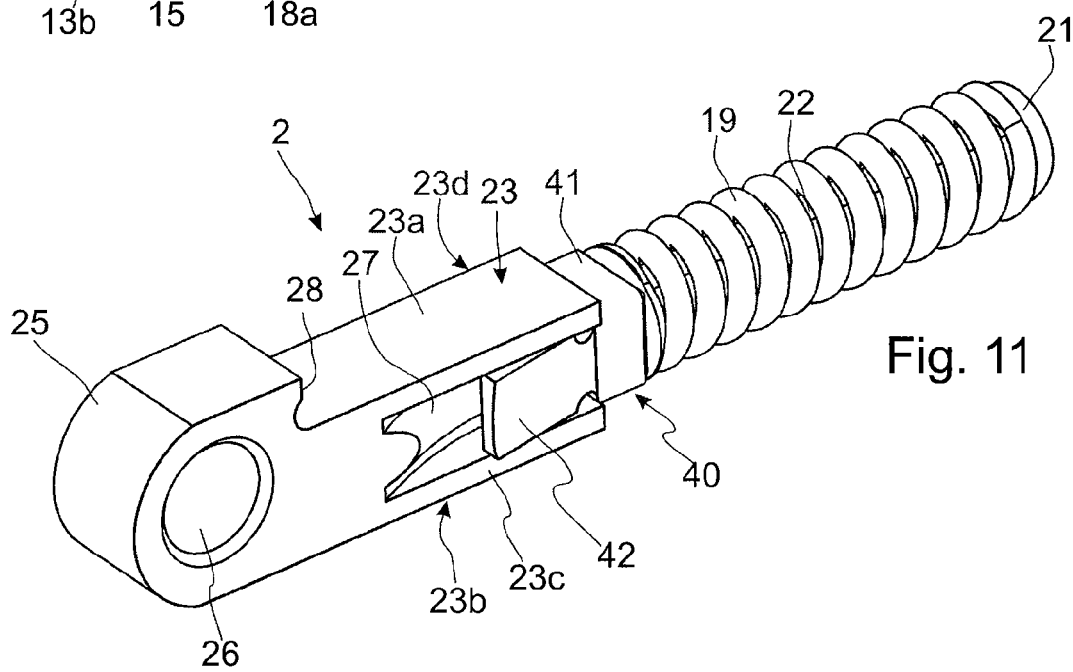

COMPACT ELASTIC HINGE FOR A SPECTACLE FRAME

BACKGROUND OF THE INVENTION

The present disclosure relates to the field of spectacles and hinges for spectacle frame. The present invention more particularly relates to an improvement of a hinge for spectacle frame of the type described in the patent application WO 2005/121 873.

The present invention thus relates to an elastic hinge for spectacle frame, comprising an articulation endpiece attached to the frame, linked by a hinge axis to a hinge element attached to a frame temple. The endpiece comprises two parallel flanges sandwiching an articulation knuckle provided at an end of the hinge element. Each of the two flanges and the knuckle has an articulation orifice provided to receive a fixing element like a screw, forming the rotation axis of the hinge.

The hinge element is shown in FIG. 1. In FIG. 1, the hinge element 100 comprises a case 101 comprising a longitudinal housing 103 with a front orifice. The longitudinal housing 103 comprises a guiding area 102 and at least one cavity 104 comprising a retaining wall 105, a slide 110 arranged in the housing according to a longitudinal translation axis, a spring 125 for returning the slide to a rest position, and a bushing 120. The slide 110 comprises a salient part 111 spreading out to the outside of the housing 103 and forming the articulation knuckle, a guided part 112 interacting with the guiding area 102, a central part, and a rod. A compression part 113 attached to the rod, forms a rear stop for the spring 125. The bushing 120 forms a front stop for the spring, and comprises a body 122 slidably mounted around the rod of the slide and at least one elastic tab 121 facing towards the front of the housing 103 according to a determined angle, which end leans against the retaining wall 105. Generally, the bushing comprises two elastic tabs which ends lean on retaining walls opposite from one another provided in the housing.

Consequently, when the slide 110 is pulled forward, the bushing 120 is blocked in translation and the spring 125 is compressed between the compression part 113 attached to the slide and the body 122 of the bushing 120 blocked in the housing 103.

Such a hinge element has a length of a few millimeters only and is usually used in the industry of spectacles.

The hinge previously described ensures a mechanical coupling between the frame and a spectacle temple having the drawback of cumulating clearances in rotation according to axes perpendicular to the axis of the hinge, both between the endpiece and the knuckle of the slide, and between the slide and the case.

The patent application WO 03/071 338 describes a compact elastic hinge for spectacle frame, shown in FIGS. 2 and 3. In FIGS. 2 and 3, the hinge comprises an articulation endpiece 150 attached to a spectacle frame, linked to a hinge element 130 attached to a frame temple. The endpiece 150 comprises two parallel flanges 151a, 151b sandwiching an articulation knuckle 145 formed at an end of the hinge element 130. Each of the two flanges 151a, 151b and the knuckle 145 have an articulation orifice provided to receive a fixing element like a screw, forming the rotation axis of the hinge.

The hinge element 130 comprises a case 131 comprising a longitudinal housing 132 with a front orifice. A slide 140 is arranged in the housing 132 according to a longitudinal translation axis. The slide is returned to a rest position by a return spring 135. The slide 140 comprises a salient part 145 spreading out to the exterior of the housing 132 and forming the articulation knuckle, a central part 143, a rod 142 and a compression part 141 attached to the rod, forming a rear stop for the spring 135. The salient part 145 has the shape of a T with an articulation orifice 146. The case 131 comprises a bump 134 forming the front stop for the spring 135, opposite the central part 143 of the slide. Thus, when the slide 140 is pulled forward outside the housing 132, the spring 135 is compressed between the compression part 141 attached to the slide and the bump 134.

To reduce the length of the slide and therefore of the case 131, the latter comprises an upper prominence 133a and a lower prominence 133b formed in the prolongation of the edge of the front orifice of the housing, these two prominences forming a lateral guiding area of the slide, exterior to the housing. The salient part 145 of the slide comprises a guided part with guiding surfaces 144a, 144b interacting with both prominences 133a, 133b. When the hinge element 130 and the endpiece are assembled, the salient part 145 of the slide 140 and the prominences 133a, 133b are inserted between the flanges 151a, 151b of the endpiece 150. That way, the flanges also perform a lateral guiding of the slide.

In the hinge shown in FIGS. 2 and 3, all the stresses exerted on the hinge according to axes perpendicular to the rotation axis of the hinge are concentrated on the flanges of the endpiece. To ensure an efficient guiding of the slide, the prominences 133a, 133b must have a sufficient length and rigidity. To that end, the dimensions of the prominences must be relatively important. The result is that the flanges must also have relatively important dimensions to free sufficient space in the endpiece around the rotation axis of the hinge, allowing the knuckle and the prominences to freely rotate. Flanges of relatively big dimensions must also be provided to ensure a correct guiding of the slide. This constraint turns out to be penalizing concerning the resistance of the endpiece against rotation stresses exerted on the temple around axes perpendicular to the axis of the hinge. The result is that the flanges tend to move aside in the long run, which causes an important clearance in the hold of the temple on the frame. The slide is then guided with a more important lateral clearance in directions according to the axis of the hinge. Such a clearance has the consequence of applying to the rod 142 of the slide bending stresses that may cause the break thereof.

BRIEF SUMMARY OF THE INVENTION

An embodiment of the present invention provides a hinge not having the aforementioned drawbacks.

An embodiment provides an elastic hinge element for spectacle frame, comprising a case comprising a longitudinal housing comprising a guiding area, a slide arranged in the housing according to a longitudinal translation axis, comprising a salient part spreading outside the housing, and a guided part interacting with the guiding area, and elastic means for returning the slide to a retracted position towards the interior of the housing.

According to one embodiment, the case comprises at least one prominence not performing the guiding of the slide and spreading out from the case to insert between two flanges parallel to a hinge endpiece, in order to perform a direct mechanical coupling between the case and the endpiece.

According to one embodiment, the prominence forms a stop arranged to interact with an element for linking the two flanges, in order to limit the rotation angle of the hinge.

According to one embodiment, the case comprises two prominences not performing the guiding of the slide and spreading out from the case on both sides of the longitudinal axis of the case, to insert between two flanges parallel to a hinge endpiece, in order to perform a mechanical coupling between the case and the endpiece.

According to one embodiment of the invention, the elastic means comprise a spring, and the slide comprises a central part and a rod which back end forms a back stop for the spring, the hinge element comprising a front stop for the spring.

According to one embodiment of the invention, the front stop comprises a bushing comprising a body mounted around the central part of the slide and at least one elastic tab pointing towards the front of the housing and which end leans against a retaining wall arranged in the housing.

According to one embodiment of the invention, the guided part of the slide comprises a recess having a size sufficient to ensure the at least partial retraction of the elastic tab when the bushing is introduced in the housing passing through the guiding area.

An embodiment of the present invention also relates to a spectacle frame, comprising a hinge element as previously defined.

An embodiment of the present invention also relates to an elastic hinge for spectacle frame comprising: an endpiece comprising two parallel flanges holding a hinge axis, a case comprising a longitudinal housing comprising a guiding area, a slide arranged in the housing according to a longitudinal translation axis, comprising a salient part spreading outside the housing and maintained in sandwich between both flanges by the hinge axis, and a guided part interacting with the guiding area, and elastic means for returning the slide to a retracted position towards the interior of the housing.

According to one embodiment, the case comprises at least one prominence not performing the guiding of the slide and spreading out from the case to insert between two flanges, in order to perform a direct mechanical coupling between the case and the endpiece.

According to one embodiment of the invention, the endpiece comprises an element for linking the two flanges arranged to interact with the prominence, in order to limit the rotation angle of the hinge.

According to one embodiment, the linking element forms a closing end stop for the frame temple.

According to one embodiment, the case comprises two prominences not performing the guiding of the slide and spreading out from the case on both sides of the longitudinal axis of the case, to insert between both flanges of the endpiece, in order to ensure a mechanical coupling between the case and the endpiece.

According to one embodiment, the elastic means comprise a spring, and the slide comprises a central part and a rod which back end forms a back stop for the spring, the hinge element comprising a front stop for the spring, attached to the case.

According to one embodiment, the front stop comprises a bushing comprising a body mounted around the central part of the slide and at least one elastic tab pointing towards the front of the housing and which end leans against a retaining wall arranged in the housing.

According to one embodiment, the guided part of the slide comprises a recess having a size sufficient to ensure the total retraction of the elastic tab when the bushing is introduced in the housing passing through the guiding area.

According to one embodiment, the salient part of the slide comprises a lug which interacts with the case to maintain the salient part outside the housing, against the restoring force exerted by the spring, the lug being arranged so as not to come in contact with the case when the slide is fixed to the endpiece by the axis of the hinge.

An embodiment of the present invention also relates to a spectacle frame, comprising a hinge as previously defined.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:

FIG. 8 is a perspective view of the endpiece of the hinge shown in FIG. 5, FIG. 9 is a perspective view of the case of the hinge shown in FIG. 5, FIG. 10 is a longitudinal section view of the case of the hinge shown in FIG. 4, FIG. 11 is a perspective view of the slide of the hinge shown in FIG. 4.

DETAILED DESCRIPTION OF THE INVENTION

Figure 1:
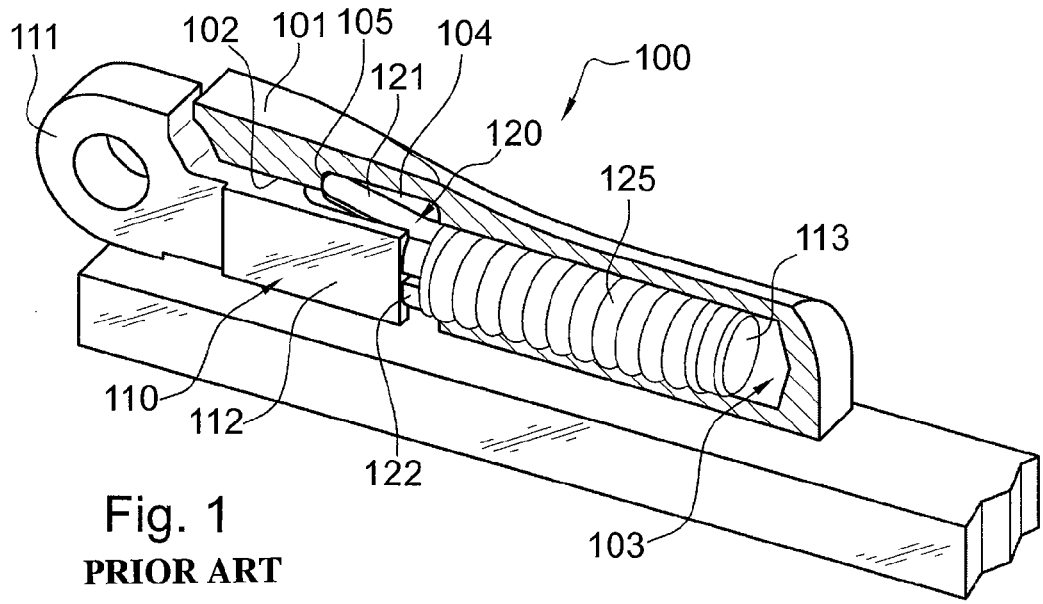
FIG. 1 is previously described is a perspective and a partial section view of a hinge element according to prior art, FIGS. 2 and 3 previously described are longitudinal section views of another hinge element according to prior art.

In the following description, numerous specific details are given to provide a thorough understanding of embodiments. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

FIGS. 4 to 7 show an example of elastic hinge for spectacle frame, according to one embodiment of the invention. In these figures, the hinge comprises an articulation endpiece 3 attached to a spectacle frame 5, linked by a hinge axis to a hinge element attached to a temple 4 of the frame.

The endpiece is shown in further details in FIG. 8. The endpiece 3 comprises two parallel flanges 31a, 31b sandwiching an articulation knuckle 25 provided at an end of the hinge element. Each of the two flanges 31a, 31b and the knuckle 25 has an articulation orifice 32, 26 provided to receive a fixing element 35 like a screw, forming the rotation axis of the hinge. The flanges 31a, 31b are linked between them by a linking element 34.

The hinge element comprises a case 1, a slide 2 arranged in the case according to a longitudinal translation axis, a spring 19 for returning the slide to a rest position retracted towards the interior of the case, and a bushing 40. The bushing 1 is shown in particular in FIGS. 9 and 10. The case 1 comprises a longitudinal housing 12 including the slide 2 and a front face 14 in which a front orifice of the housing is formed. The shape of the housing is designed to be able to introduce therein, passing by the front orifice, the set formed by the slide 2, the bushing 40, and the spring 19. The housing 12 comprises a guiding area 15 and at least one cavity 18 comprising a retaining wall 18a, substantially perpendicular to the translation axis of the slide and facing the rear of the housing 12.

The slide 2 is shown in particular in FIG. 11. The slide 2 comprises a salient part 25 forming the articulation knuckle, spreading out to the exterior of the housing 12, a guided part 23 interacting with the guiding area 15 of the housing 12, a central part 24, and a rod 22. The salient part 25 forms a knuckle comprising a hole 26 provided to receive the hinge axis 35 fixing the knuckle with the endpiece 3. The central part 24 and the rod 22 have a smaller section than the guided part 23. A compression part 21 attached to the rod, forms a rear stop for the spring 19. The central part 24 and the rod 22 which are here formed by one and the same rod, have a rectangular, round or polygonal section, around which the bushing 40 and the spring 19 are threaded.

The compression part 21 may be an element different of the rod 22, or be conventionally formed by a blister at the end of the rod. In the last case, the part 21 is a part of the rod itself.

The walls of the guiding area 15 do not necessarily cover all the guiding area, which may be obtained by piercing a cylindrical orifice forming the housing, then by machining flat guiding walls in the cylindrical orifice forming kinds of rails.

The bushing 40 forms a front stop for the spring 19, and comprises to that end a body 41 slidably mounted around the rod 22 of the slide, and at least one elastic tab 42 facing towards the front of the housing 12 according to a determined angle in relation to the translation axis of the slide 2. Generally, the bushing comprises two elastic tabs arranged along two opposed faces of the guiding area of the slide. Recesses 27 are formed in the guiding area 23 of the slide.

Once equipped with the bushing 40, the spring 19 and the compression part 21, the slide is introduced in the housing 12 passing through the front orifice. When the slide goes through the guiding area 15, the elastic tabs 42 retract into the recesses 27. In rest position of the slide inside the housing, the elastic tabs loosen and their ends extend in the cavities 18 formed in the housing 12, opposite to the retaining walls 18a. Thus, when the slide 2 is pulled towards the exterior of the case, the spring 19 pushes the elastic tabs 42 against the retaining walls 18a which thus block the bushing 40 in translation. The spring 19 then compresses between the compression part 21 and the bushing 40, exerting a force for returning the slide to its rest position.

As it appears in FIG. 11, the guided part 23 of the slide has left 23c and right 23d lateral faces which ensure the left and right guiding of the slide, as well as upper 23a and lower 23b lateral faces which ensure the upper and lower lateral guiding of the slide. In the present example, the recesses 27 are made on the faces 23c, 23d. The elastic tabs 42 and the recesses 27 are here of a width inferior to the width of the faces 23c, 23d so that advantageously narrow strips remain on the edge of the recesses, which form kinds of rails or glides also ensuring the left and right lateral guiding of the slide. The rear part of the guided part 23 thus has a section substantially in the shape of a H laid on its side.

Admittedly, the recesses 27 may alternately be made on the upper and lower lateral faces of the guiding area 23, or on the four faces of the guiding area at once if the bushing comprises four elastic tabs.

According to an embodiment, the case 1 comprises at least one prominence 13a provided to insert between the flanges 31a, 31b of the endpiece 3. The prominence 13a spreads axially from the front face 14 of the case.

Advantageously, two prominences 13a, 13b are provided on the front face 14 of the case, on both sides of the orifice of the housing 12. The ends of the prominences 13a, 13b insert between the flanges 31a, 31b of the endpiece 3 in order to ensure a direct mechanical coupling between the case 1 and the endpiece 3. It is to be noted that this mechanical coupling is not an obstacle to the free rotation of the hinge. The provision of the prominences 13a, 13b allows the clearance between the case and the endpiece to be suppressed, or failing that, to be limited. In particular, as the case is attached to a temple 4 of the frame, the prominences 13a, 13b allow unwanted rotation movements of the temple around the longitudinal axis thereof, in relation to the frame, to be suppressed or reduced. These rotation movements are caused by the mechanical clearances (resulting from manufacturing tolerances or wear) existing on the one hand between the endpiece and the slide, and on the other hand, between the slide and the case in the guiding area 15.

Figure 6:
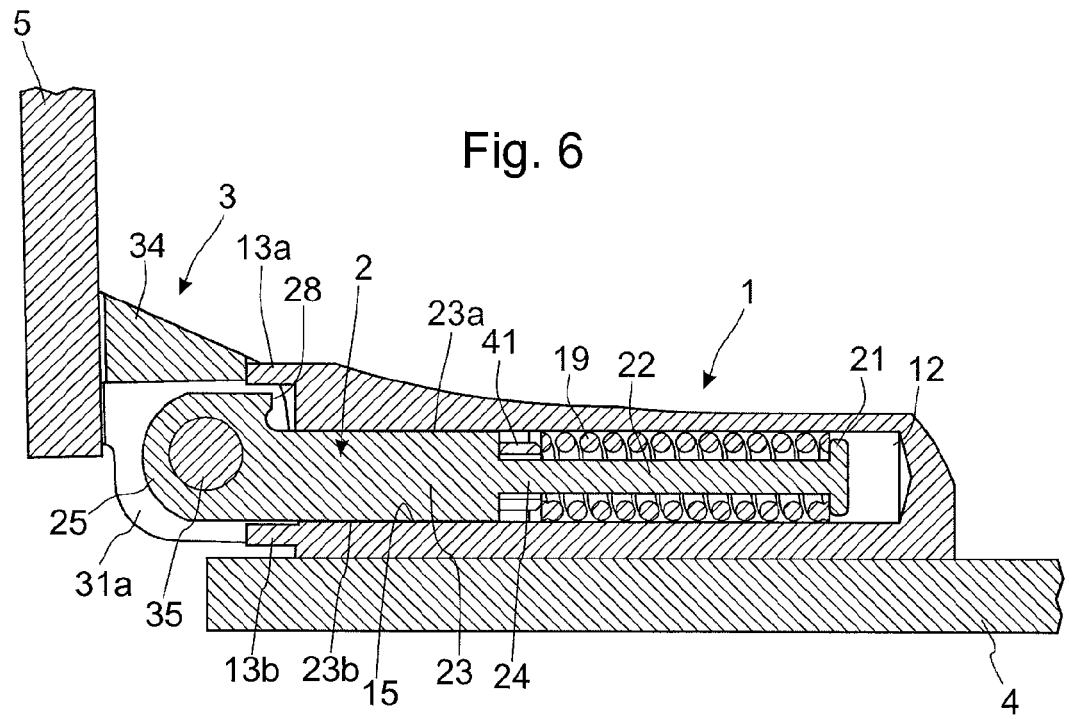
Figure 7:
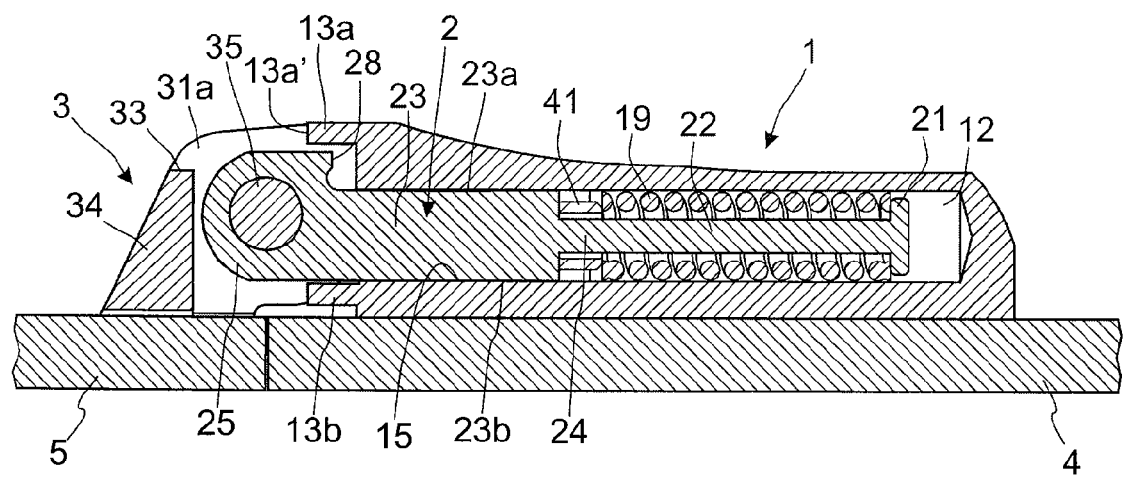

It is to be noted that the prominences 13a, 13b as shown in FIGS. 6 and 7 are not in contact with the slide 2. The prominences do not therefore perform the function of guiding the slide. The function of guiding the slide is thus totally dissociated from the function of anti-tipping of the temple 4 around the axis thereof, performed by the prominences. The result is that the slide is properly guided whatever the lateral clearance of the hinge. Another result is that the prominences 13a, 13b may have notably smaller dimensions than those of the prominences 133a, 133b of the hinge of prior art shown in FIGS. 2 and 3, where the prominences 133a, 133b also have to perform a function of guiding the slide. Thus, in the example of FIGS. 6 and 7, the axis of the hinge is totally at the right of the plane containing the front faces of the prominences 13a, 13b. By way of example, the prominences have a length of about 0.9 mm and a thickness of about 0.35 mm, whereas the hinge has a diameter of about 1.4 mm.

The result is that the stresses exerted by the knuckle and the prominences on the endpiece are relatively low, so that it is not necessary to increase the resistance of the endpiece. Thus, in the previous example, the sides of the flanges have dimensions of about 3 mm.

The linking element 34 of the endpiece 3 has an upper face 33 forming a stop interacting with the front face 13a' of the prominence 13a of the case 1, in order to limit the rotation angle of the hinge. The upper face 33 of the linking element is arranged so that the upper prominence 13a is stopped against the linking element 34 when the spectacle frame is in closed position, as shown in FIG. 6.

In FIGS. 6, 7 and 11, the salient part 25 of the slide 2 comprises a lug 28 arranged opposite to the front face 14 of the case 1. The lug 28 is provided to axially block the slide during the introduction thereof into the case. As shown in FIGS. 6 and 7, when the slide 2 is assembled to the endpiece 3, the spring 19 is slightly compressed and the lug 28 is moved aside the front face 14 of the case 1, whatever the angular position of the hinge element in relation to the endpiece.

It will be clear to those skilled in the art that the present invention is susceptible of various other embodiments. In particular, although two prominences are preferable, the invention also relates to a hinge element only comprising one lower 13b or upper 13a prominence. The mechanical coupling between the hinge element and the endpiece is performed by the axis of the hinge and the prominence.

The linking element 34 between the two flanges 31a, 31b of the endpiece 3 may be arranged in order not to form a stop interacting with the upper prominence 13a when the frame temple is in closed position. Thus, the linking element 34 may have a small height in relation to the linking element shown in particular in FIGS. 6 and 7 in order not to come in contact with the prominence 13a when the temple 4 is at the closing stroke-end thereof.

Figure 2:
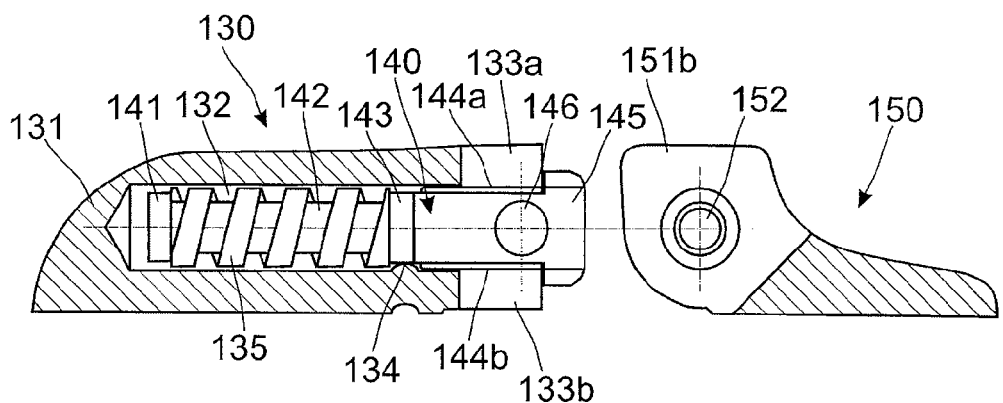
Figure 3:
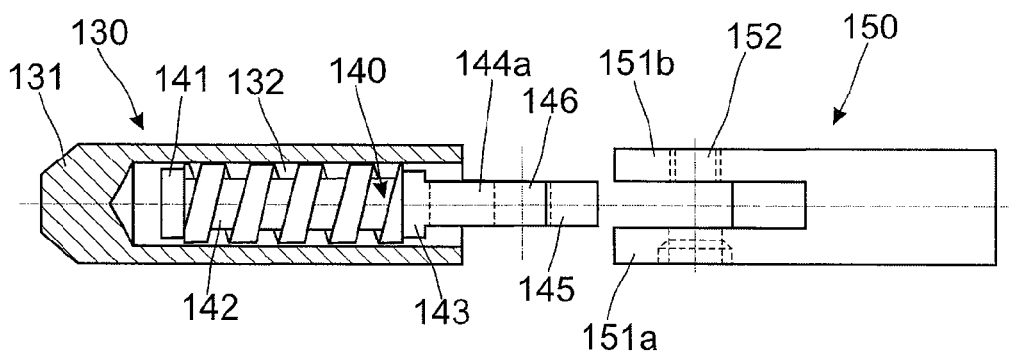
Figure 4:
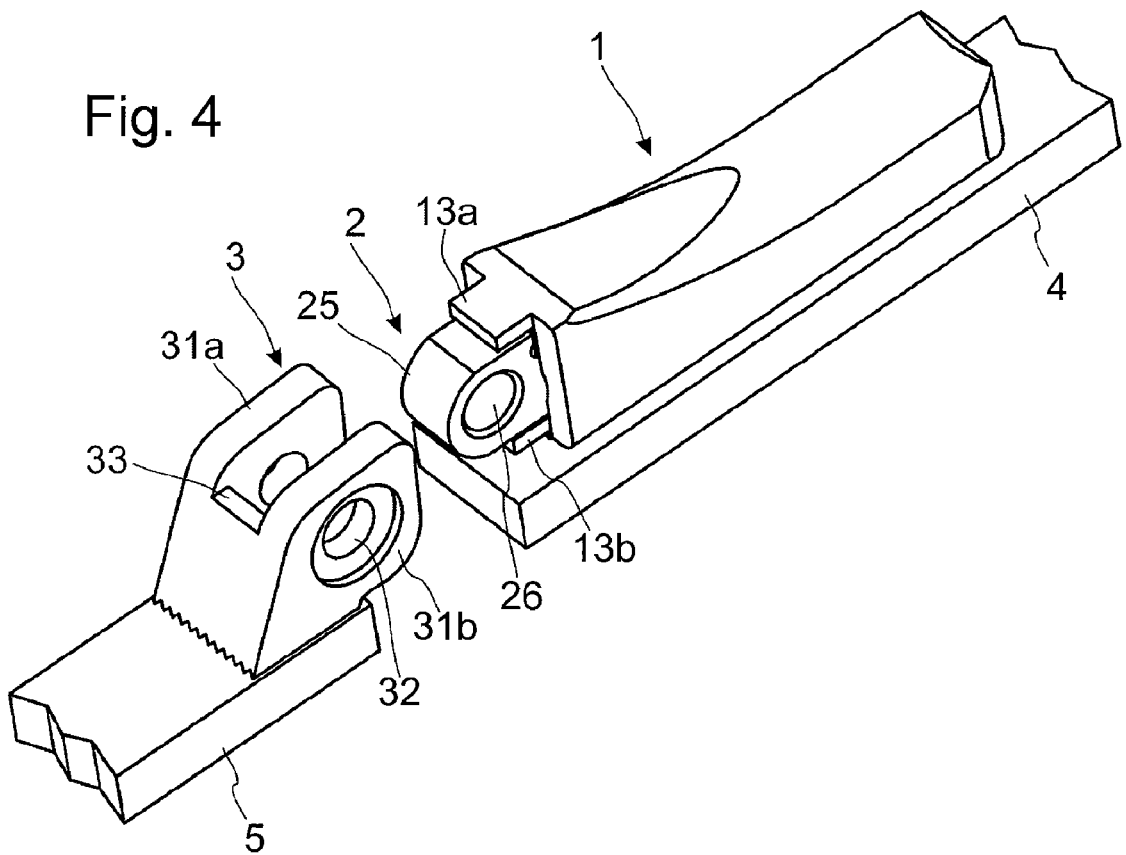
FIG. 4 is a perspective view of a disassembled hinge of an embodiment of the present invention.
Figure 5:
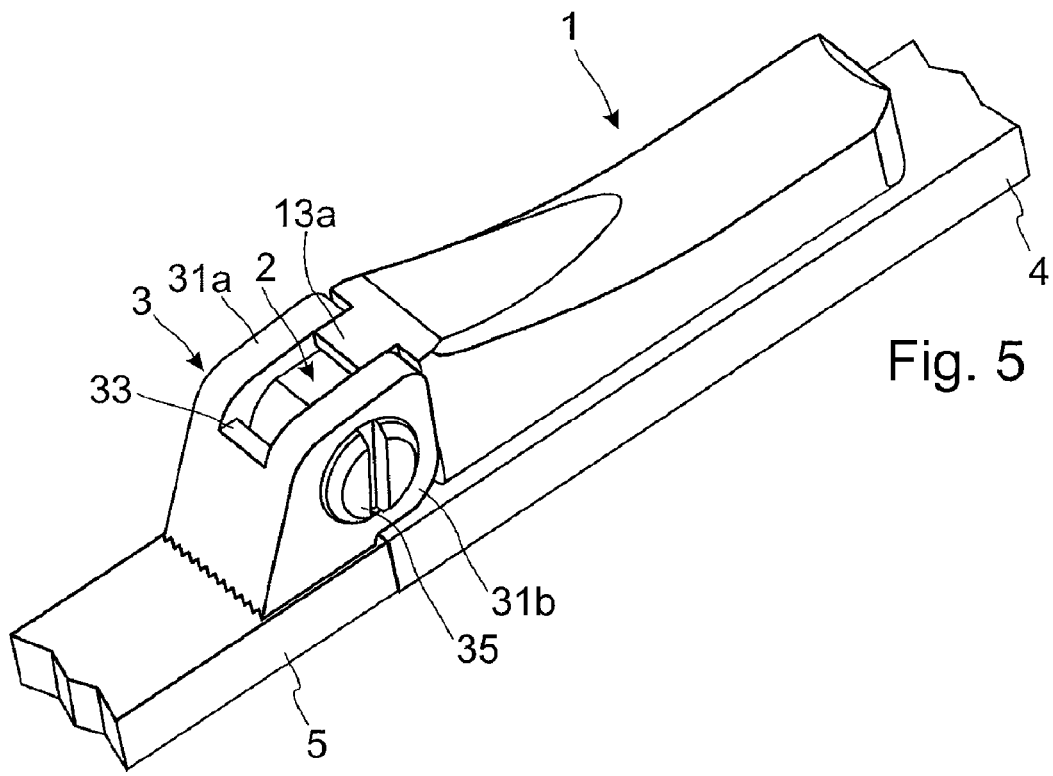
FIG. 5 is a perspective view of the assembled hinge shown in FIG. 4, FIGS. 6 and 7 are longitudinal section views of the hinge shown in FIG. 5, respectively in closed position and open position.

In addition, the bushing 40 as previously described may be replaced by any other front stop means. Thus, it may be considered to form, for example by punching, one or more bosses inside the case at the location of the body of the bushing, as shown in FIG. 2.

Besides, other elastic return means may be provided instead of the spring 19 to return the slide to the rest position thereof, retracted towards the interior of the case.

The hinge according to the invention is susceptible of various arrangements. Although usually fixed on spectacle frame temples, the hinge element may also be mounted onto the structure of the frame, or onto a fixed part of the temple attached to the structure of the frame.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The above description of illustrated embodiments, including what is described in the Abstract, is not intended to be exhaustive or to limit the invention to the precise forms disclosed. While specific embodiments and examples are described herein for illustrative purposes, various equivalent modifications are possible within the scope of the invention and can be made without deviating from the spirit and scope of the invention.

These and other modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. An elastic hinge element for a spectacle frame, comprising:
    a case comprising a longitudinal housing comprising a guiding area,
    a slide axially arranged in the housing, comprising a salient part extending outside the housing, and a guided part interacting with the guiding area,
    elastic means for returning the slide to a retracted position towards an interior of the housing, and
    at least one prominence configured to not perform the guiding of the slide, the prominence extending from the case and being configured to insert between two parallel flanges of an endpiece in order to perform a direct mechanical coupling between the case and the endpiece, wherein the prominence forms a stop arranged to interact with an element for linking the two flanges in order to limit a rotation angle of the hinge.

2. The hinge element according to claim 1, wherein the case comprises two prominences not performing the guiding of the slide and spreading out from the case on both sides of the longitudinal axis of the case, to insert between two flanges parallel to a hinge endpiece, in order to perform a mechanical coupling between the case and the endpiece.

3. The hinge element according to claim 1, wherein the elastic means comprise a spring, and the slide comprises a central part and a rod whose back end forms a back stop for the spring, the hinge element comprising a front stop for the spring.

4. The hinge element according to claim 3, wherein the front stop comprises a bushing comprising a body mounted around the central part of the slide and at least one elastic tab pointing towards a front of the housing and whose end leans against a retaining wall arranged in the housing.

5. The hinge element according to claim 4, wherein the guided part of the slide comprises a recess having a size sufficient to ensure at least a partial retraction of the elastic tab when the bushing is introduced in the housing passing through the guiding area.

6. A spectacle frame comprising a hinge element comprising:
    a case comprising a longitudinal housing comprising a guiding area,
    a slide axially arranged in the housing, comprising a salient part spreading outside the housing, and a guided part interacting with the guiding area, and
    elastic means for returning the slide to a retracted position towards an interior of the housing, and
    at least one prominence configured to not perform the guiding of the slide, the prominence extending from the case and being configured to insert between two parallel flanges of an endpiece in order to perform a direct mechanical coupling between the case and the endpiece, wherein the prominence forms a stop arranged to interact with an element for linking the two flanges in order to limit the rotation angle of the hinge.

7. The spectacle frame according to claim 6, wherein the case comprises two prominences not performing the guiding of the slide and extending from the case on two sides of the longitudinal axis of the case, to insert between two parallel flanges of a hinge endpiece, in order to perform a mechanical coupling between the case and the endpiece.

8. The spectacle frame according to claim 6, wherein the elastic means comprise a spring, and the slide comprises a central part and a rod whose back end forms a back stop for the spring, the hinge element comprising a front stop for the spring.

9. The spectacle frame according to claim 8, wherein the front stop comprises a bushing comprising a body mounted around the central part of the slide and at least one elastic tab pointing towards a front of the housing and whose end leans against a retaining wall arranged in the housing.

10. The spectacle frame according to claim 9, wherein the guided part of the slide comprises a recess having a size sufficient to ensure at least a partial retraction of the elastic tab when the bushing is introduced in the, housing passing through the guiding area.

11. An elastic hinge for a spectacle frame, comprising:
    an endpiece comprising two parallel flanges defining a hinge axis,
    a case comprising a longitudinal housing comprising a guiding area, a slide axially arranged in the housing and comprising a salient part extending outside the housing and arranged between the flanges along the hinge axis, a guided part interacting with the guiding area, elastic means for returning the slide to a retracted position towards an interior of the housing, and at least one prominence not performing the guiding of the slide and protruding from the case to insert between the flanges in order to ensure a direct mechanical coupling between the case and the endpiece, wherein the endpiece comprises an element for linking the two flanges and which is arranged to interact with the prominence in order to limit the rotation angle of the hinge.

12. The hinge according to claim 11, wherein the linking element forms a closing end stop for the frame temple.

13. The hinge according to claim 11, wherein the case comprises two prominences not performing the guiding of the slide and extending from the case on two sides of the longitudinal axis of the case, to insert between both flanges of the endpiece, in order to ensure a mechanical coupling between the case and the endpiece.

14. The hinge according to claim 11, wherein the elastic means comprise a spring, and the slide comprises a central part and a rod whose back end forms a back stop for the spring, the hinge element comprising a front stop for the spring, attached to the case.

15. The hinge according to claim 14, wherein the front stop comprises a bushing comprising a body mounted around the central part of the slide and at least one elastic tab facing towards a front of the housing and which end leans against a retaining wall arranged in the housing.

16. The hinge according to claim 15, wherein the guided part of the slide comprises a recess having a size sufficient to ensure a total retraction of the elastic tab when the bushing is introduced in the housing passing through the guiding area.

17. The hinge according to claim 11, wherein the salient part of the slide comprises a lug which interacts with the case to maintain the salient part outside the housing, against the restoring force exerted by the spring, the lug being arranged so as to not come in contact with the case when the slide is connected to the endpiece along the hinge axis.

18. A spectacle frame, comprising an elastic hinge comprising:

an endpiece comprising two parallel flanges defining a hinge axis, a case comprising a longitudinal housing comprising a guiding area, a slide axially arranged in the housing, comprising a salient part extending outside the housing and arranged between the flanges along the hinge axis, and a guided part interacting with the guiding area, elastic means for returning the slide to a retracted position towards the interior of the housing, and at least one prominence not performing the guiding of the slide and extending from the case to insert between the flanges, in order to ensure a direct mechanical coupling between the case and the endpiece, wherein the endpiece comprises a linking element for linking the two flanges which is arranged to interact with the prominence in order to limit a rotation angle of the hinge.

19. The spectacle frame according to claim 18, wherein the linking element forms a closing end stop for a frame temple.

20. The spectacle frame according to claim 18, wherein the case comprises two prominences not performing the guiding of the slide and extending from the case on two sides of the longitudinal axis of the case, to insert between both flanges of the endpiece, in order to ensure a mechanical coupling between the case and the endpiece.

21. The spectacle frame according to claim 18, wherein the elastic means comprise a spring, and the slide comprises a central part and a rod whose back end forms a back stop for the spring, the hinge element comprising a front stop for the spring, attached to the case.

22. The spectacle frame according to claim 21, wherein the front stop comprises a bushing comprising a body mounted around the central part of the slide and at least one elastic tab facing towards a front of the housing and which end leans against a retaining wall arranged in the housing.

23. The spectacle frame according to claim 22, wherein the guided part of the slide comprises a recess having a size sufficient to ensure a total retraction of the elastic tab when the bushing is introduced into the housing passing through the guiding area.

24. The spectacle frame according to claim 18, wherein the salient part of the slide comprises a lug which interacts with the case to maintain the salient part outside the housing, against a restoring force exerted by the spring, the lug being arranged so as to not come in contact with the case when the slide is connected to the endpiece along the axis of the hinge.

* * * * *